Patented Feb. 24, 1931

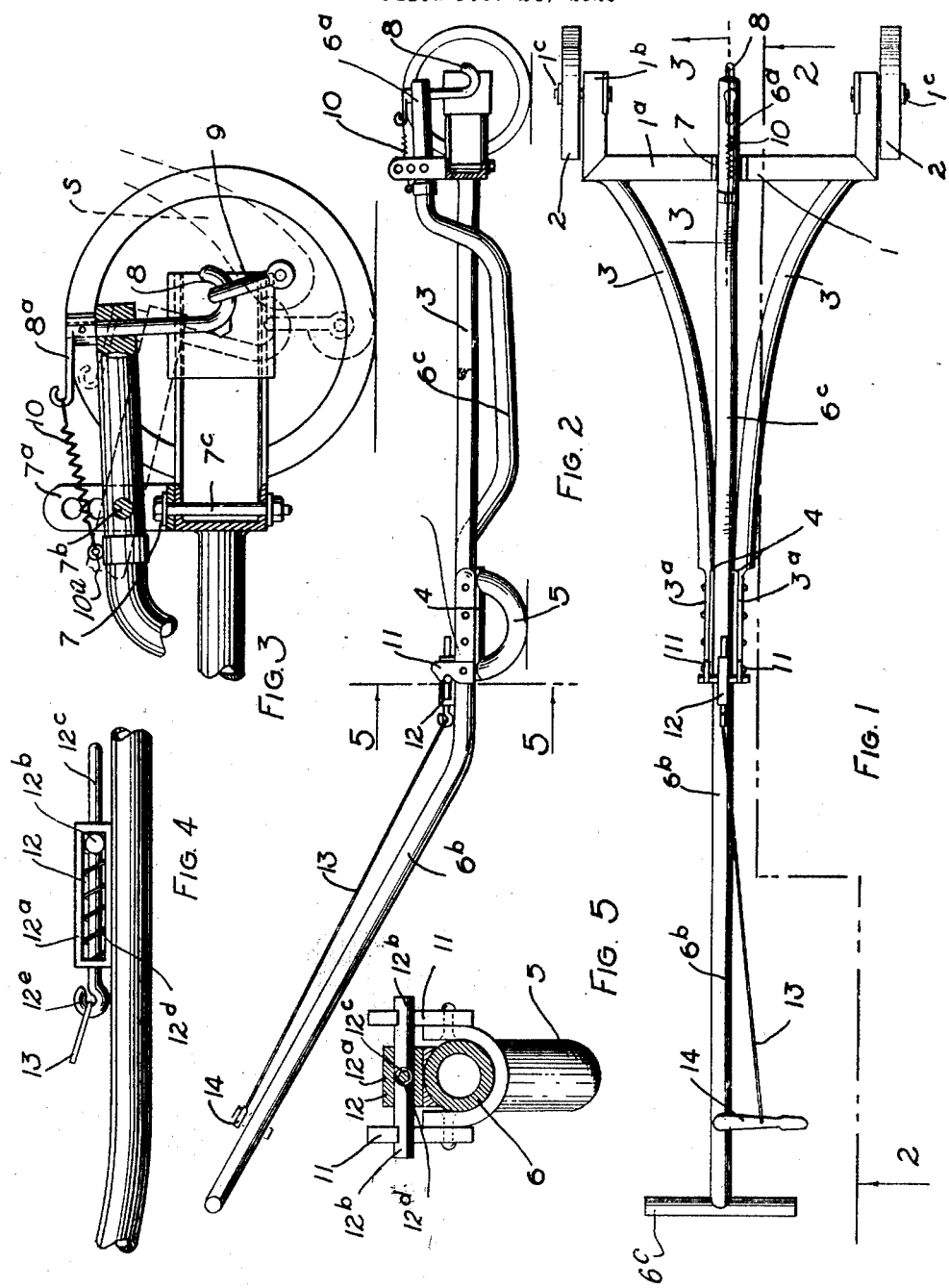

1,794,027

UNITED STATES PATENT OFFICE

WILLIS B. McLENDON AND MARTIN F. WAGNER, OF SAN DIEGO, CALIFORNIA

AIRPLANE TAIL JACK AND DOLLY

Application filed December 24, 1928. Serial No. 328,159.

Our invention relates to airplane tail jacks and dollies, and the objects of our invention are: First, to provide a device of this class which is adapted to readily engage a loop portion forming a part of the tail skid of an airplane, lifting said tail skid so as to easily move said airplane; second, to provide a device of this class in which a hook member engageable with a loop forming a part of the tail skid of an airplane, is resiliently held in the proper position for engaging said loop; third, to provide a device of this class which may be turned at a sharp angle relative to the airplane to which it is attached, so that said airplane may be moved in an arc having a small radius; fourth, to provide a device of this class which lifts the tail skid off the ground so that the airplane may be readily moved into and out of the hangar, or other desirable places; fifth, to provide a device of this class which engages and raises the tail skid of the airplane with a minimum of manipulating; sixth, to provide a device of this class which is especially adapted to be used in connection with landing fields having considerable traffic where it is essential to quickly move the airplane after it has landed, out of the way; seventh, to provide a device of this class which is built extremely low so as to clear the rudder and elevators of an airplane; eighth, to provide a device of this class which can be used on various sizes and types of airplanes, providing said airplanes are equipped with a loop member adapted to extend upwardly from the end portion of the tail skid; ninth, to provide a device of this class which is simple, sturdy and rigid of construction, durable, efficient in its action, and which will not readily deteriorate or get out of order.

With these and other objects in view as will appear hereinafter, our invention consists of certain novel features of construction, combination and arrangement of parts and portions as will be hereinafter described in detail, and particularly set forth in the appended claims, reference being had to the accompanying drawings thereof, which form a part of this application.

Fig. 1 is a plan view of our tail jack and dolly. Fig. 2 is a sectional, elevational view through 2—2 of Fig. 1. Fig. 3 is an enlarged fragmentary sectional view through 3—3 of Fig. 1, with parts and portions shown in elevation to facilitate the illustration. Fig. 4 is an enlarged fragmentary elevational view of a portion of the jack member showing the catch member in connection therewith; Fig. 5 is an enlarged sectional view through 5—5 of Fig. 2.

Similar characters of reference refer to similar parts and portions throughout the several views of the drawings.

Axle member 1, wheel 2, frame member 3, channel member 4, support 5, jack member 6, swivel member 7, hook member 8, loop member 9, spring 10, catch dog 11, catch member 12, link member 13, and catch operating arm 14, constitute the principal parts and portions of our airplane tail jack and dolly.

A substantially U-shaped axle member 1 is provided, the cross portion 1a of which is considerably longer than the leg portion 1b. The axle member is preferably formed of channel iron and the cross portion 1a preferably joins said leg portions 1b at right angles thereto. Projecting outwardly from each leg portion 1b is a sub-axle 1c upon which is mounted a wheel 2.

Secured to the cross portion 1a of the axle 1 near each end thereof is a frame member 3 which is preferably tubular. The two frame members converge and extend rearwardly from the axle 1. The ends 3a of the frame members 3 are flattened and are secured to opposite sides of a channel member 4, the inner side surfaces of which preferably form a continuation of the inner sides of the frame members, as shown best in Fig. 1. Secured to the under side of the channel member 4 is a support 5 which is adapted to hold the frame members 3 substantially parallel with the ground.

The frame members 3 are preferably curved in such a manner that their convex sides face each other, thus permitting their inner, or convex sides to merge gradually into the channel member 4. The channel member 4 is only long enough to adequately secure the ends of the frame members and form a suitable surface for securing the support 5.

A jack member 6, in the form of a lever, is pivotally secured near its one end to a swivel member 7. The swivel member 7 consists of a bifurcated portion 7a, which extends on either side of the jack member 6 and supports the ends of a fulcrum pin 7b, which extends horizontally through the jack member 6. The swivel member 7 is pivotally mounted upon the cross-portion 1a of the axle 1, in alinement with the channel 4. A pin 7c, extending downwardly through the base of the bifurcated portion 7a, and through the channel member, permits the desired pivotal movement of the swivel member.

The shorter end 6a of the jack member extends between the wheels 2, and terminates approximately opposite a vertical plane passing through the axes of the wheels. Pivotally mounted in the portion 6a of the jack 6 and extending downwardly therefrom is a hook member 8. This hook member is adapted to engage a loop member 9, which is secured to the lower portion of an airplane tail skid, as shown by dotted lines in Fig. 3. The loop member 9 is secured to the tail skid in such a manner that it always extends upwardly so as not to interfere with the operation thereof.

In order to facilitate the engagement of the hook member 8 with the loop member 9, an arm 8a extends rearwardly from the upper end portion of said hook member. Said arm is connected to the one end of a spring 10, the other end of said spring being secured to a clamp 10a. Thus the hook 8 may pivot about its axis, but said hook normally returns to centered position so as to engage said loop 9.

The position of the hook 8 is such that the tail skid, when supported by the jack, is approximately in the axis of and intermediate the wheels 2, thus said wheels carry practically all of the weight, leaving the extended portions of the device free for easy manipulation.

The intermediate portion of the longer arm 6b of the jack 6 is adapted to rest in the channel 4 when said arm is in its lowered position, as shown in Figs. 1, 2 and 5 of the drawings. The portion 6c of the arm 6b between the channel 4 and point of support, is bent downwardly as much as possible so as to enable said arm when raised to clear the rudder, or elevators of an airplane.

Projecting upwardly from each side of the channel member 4 at the extended end thereof is a catch dog 11, one catch dog on each side of the jack 6. A catch member 12 is adapted to engage the dogs 11. The catch member 12 consists of a housing 12a, secured to the longer arm of the jack 6, and having slots in the side walls thereof extending longitudinally with said jack member, through which project the ends of a pin 12b. The pin 12b extends transversely to the arm 6a, and the ends thereof are adapted to be engaged by hook portions of the catch dogs 11. A rod 12c extends longitudinally with the arm 6b and is adapted to reciprocate in openings provided in the ends of the housing 12a. The rod 12c is secured to and supports the transversely extending pin 12b. A spring 12d mounted within the housing, one end thereof resting against the housing and the other end thereof pressing against the pin 12b, tends to force said pin into engagement with the hook portion of the dog 11. A short distance past the channel 4 the arm 6b is bent upwardly, then extends a suitable distance and terminates in a handle portion 6c. The end of the rod 12c facing said handle is provided with a loop 12e therein, to which is fastened the one end of a link member 13. The other end of said link member is connected intermediate the ends of an arm 14 which is pivotally secured to the extended portion of the jack 6 near the handle thereof. Movement of this arm 14 causes the pin 12c to disengage the catch portion of the dog 11.

The operation of our device is as follows: The device is moved until the wheels 2 are on either side of the tail skid of an airplane. The pin 12b is then released from the dogs 11 and the jack member 6 is raised, then pivoted to one side or the other until the hook 8 can be brought into engagement with the loop 9. The arm 6b of the jack is then brought downwardly until the pin 12b again engages the dog 11. When this is accomplished the airplane is supported at all points upon wheels enabling it to be easily moved.

The spring 10 maintains the hook 8 in the position which will permit the most ready engagement thereof with the loop 9 secured to the tail skid.

Pivotal movement of the swivel 7 permits the hook to be moved to one side or the other if the tail skid should not be in alinement with the jack when the jack is in its normal position.

The curvature of the frame members 3 causes the member 6 to automatically center itself so that the catch may engage the dog. Thus when the catch has engaged the dog 11, the frame members 3, channel 4 and support 5 are connected to the arm 6b, so that the device forms a dolly.

It will be noted, as shown in Fig. 2, that the device may be made very low so that it may be easily manipulated under low hanging portions of an airplane.

It is obvious from the structure disclosed in the drawings and described in the foregoing specification that there is provided an airplane tail jack and dolly as aimed at and set forth in the objects of the invention, and though we have shown and described a particular construction, combination and arrangement of parts and portions, we do not wish to be limited to this particular construction, combination and arrangement, but desire to include in the scope of our invention the construction, combination and arrangement substantially as set forth in the appended claims.

Having thus described our invention, what we claim as new and desire to secure by Letters Patent is:

1. In a device for raising the tail skid of an airplane, a frame, wheels supporting the one end of said frame, a lever member forming a jack pivotally secured to the wheel supported end of said frame rearwardly of the wheel axis, and means on the end of said lever between the axles of said wheels for engaging and raising said tail skid.

2. In a device for raising the tail skid of an airplane, a frame, wheels supporting the one end of said frame, a lever member forming a jack pivotally secured to the wheel supported end of said frame rearwardly of the wheel axis, engaging means pivotally mounted at the one end of said lever member between the axles of said wheels, for engaging and raising said tail skid.

3. In a device for raising the tail skid of an airplane, a frame, wheels supporting the one end of said frame, a lever member forming a jack pivotally secured to the supported end of said frame, engaging means pivotally mounted at the one end of said lever member between said wheels, for engaging and raising said tail skid, and means for resiliently holding said engaging means in position for cooperating with said tail skid.

4. In a device for raising the tail skid of an airplane, a frame, wheels supporting the one end of said frame, a skid portion supporting the other end of said frame, a lever member forming a jack pivotally secured to said frame rearwardly of the wheel axis, means for removably securing said lever to the skid supported end of said frame, and means mounted on said lever member between said wheels for engaging said airplane tail skid.

5. In a device for raising the tail skid of an airplane, a frame, wheels supporting the one end of said frame, a skid portion supporting the other end of said frame, a lever member forming a jack pivotally secured to said frame rearwardly of the wheel axis, means for removably securing said lever to the skid supported end of said frame, and downwardly extending engaging means pivotally mounted at the one end of said lever member between said wheels, for engaging said airplane tail skid.

6. In a device for raising the tail skid of an airplane, a frame, wheels supporting the one end of said frame, a skid portion supporting the other end of said frame, a lever member forming a jack, horizontally rotatable joint means pivotally securing said lever near the wheel supported end of said frame, means for removably securing said lever to the skid supported end of said frame, engaging means pivotally mounted at the one end of said lever member between said wheels, said lever member provided with a downwardly extending offset portion for clearing projecting portions of an airplane when said lever is in its elevated position.

7. In a device for raising the tail skid of an airplane, a frame, wheels supporting the one end of said frame, a lever member forming a jack pivotally secured to the supported end of said frame, engaging means pivotally mounted at the one end of said lever member between said wheels, dog means mounted on said frame, and catch means mounted on said lever engageable with said dog means for removably securing said lever and frame together.

8. In a device of the class described, a frame, wheels supporting the one end of said frame means, a lever forming a jack, a swivel mounted upon said frame forming the fulcrum of said lever, and permitting horizontal and vertical movement thereof, the one arm of said lever adapted to extend between said wheels, the other arm of said lever adapted to extend past the end of said frame unsupported by said wheels and form a handle, latch means mounted on said lever for engaging a portion of said frame, and means connected with the first mentioned arm of said lever for engaging a portion of the tail of an airplane.

9. In a device for raising the tail skid of an airplane, a frame, wheels supporting the one end of said frame means, a lever forming a jack, a swivel mounted upon said frame forming the fulcrum of said lever, and permitting horizontal and vertical movement thereof, the one arm of said lever adapted to extend between said wheels, the other arm of said lever adapted to extend past the end of said frame unsupported by said wheels and form a handle, means mounted on said lever for releasably securing said handle in rigid relation to said frame thereby permitting said second mentioned arm of said lever to act as a handle for shifting said frame, engaging means pivotally mounted in a vertical axis on said first mentioned arm of said lever, for engaging said airplane tail skid.

10. In a device for raising the tail skid of an airplane, a frame, wheels supporting the one end of said frame means, a lever forming a jack, a swivel mounted upon said frame forming the fulcrum of said lever and permitting horizontal and vertical movement thereof, the one arm of said lever adapted to extend between said wheels, the other arm of said lever adapted to extend past the end of said frame unsupported by said wheels and form a handle, means mounted upon said lever for releasably securing said handle in rigid relation to said frame thereby permitting said second mentioned arm of said lever to act as a handle for shifting said frame, engaging means pivotally mounted on said first mentioned arm of said lever, and means for resiliently holding said engaging means in co-operating relation to said tail skid.

11. In a device for raising the tail skid of an airplane, a frame, wheels supporting the one end thereof, a lever member, universal joint means mounted upon said frame means for supporting said lever, interlockable mechanism for removably engaging the one arm of said lever with said frame, said lever forming a part of said frame when engaged thereto, and a jack means when disengaged therefrom, and means mounted on the other arm of said lever for engaging the tail portion of an airplane.

12. In a device for raising an airplane skid provided with an eye member, a frame, wheels supporting the one end thereof, a lever member, universal joint means mounted upon said frame means for supporting said lever, interlockable mechanism for removably engaging the one arm of said lever with said frame, said lever forming a part of said frame when engaged thereto, and a jack means when disengaged therefrom, a hook pivotally mounted upon said other arm of said lever, between said wheels adapted to engage said tail skid eye member and raise said tail skid.

13. In a device for raising an airplane skid provided with an eye member, a frame, wheels supporting the one end thereof, a lever member, universal joint means mounted upon said frame means for supporting said lever, interlockable mechanism for removably engaging the one arm of said lever with said frame, said lever forming a part of said frame when engaged thereto and a jack means when disengaged therefrom, an engaging hook member pivotally mounted in a vertical axis upon said other arm of said lever, and means for resiliently holding said engaging means in co-operating position with said eye member.

14. In an airplane tail jack and dolly, an axle including a horizontally offset yoke portion, wheels mounted on said axle, a substantially horizontal, rearwardly extending frame portion secured to said yoke portion, a channel member at the outer end of said frame portion in the longitudinal axis thereof, a lever pivotally mounted intermediate its ends on said yoke portion and adapted to lie in said channel member, interlocking means for removably securing said lever in said channel, and means at the one end of said lever between said wheels for engaging the tail skid of an airplane when said interlocking means is released, whereby said airplane skid may be raised, said lever forming a handle for rolling said wheels when secured in said channel.

In testimony whereof, we have hereunto set our hands at San Diego, California this 12th day of December, 1928.

WILLIS B. McLENDON.
MARTIN F. WAGNER.